O. L. Reynolds,
Turning Irregular Forms.

Nº 11,533.          Patented Aug. 15, 1854.

UNITED STATES PATENT OFFICE.

O. L. REYNOLDS, OF DOVER, NEW HAMPSHIRE.

MACHINE FOR CUTTING IRREGULAR FORMS.

Specification of Letters Patent No. 11,533, dated August 15, 1854.

*To all whom it may concern:*

Be it known that I, O. L. REYNOLDS, of Dover, in the county of Strafford and State of New Hampshire, have invented a new and Improved Machine for Cutting Articles of Irregular Forms, such as Shoe-Lasts, Spokes, &c.; and I do hereby declare that the following is a full, clear, and exact description of the construction and operation of the same, reference being had to the annexed drawings, making a part of this specification, in which—

Figure 1:
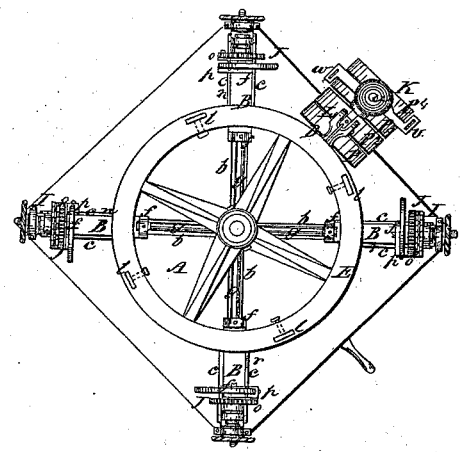
Figure 3:
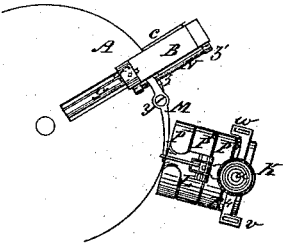
Figure 2:
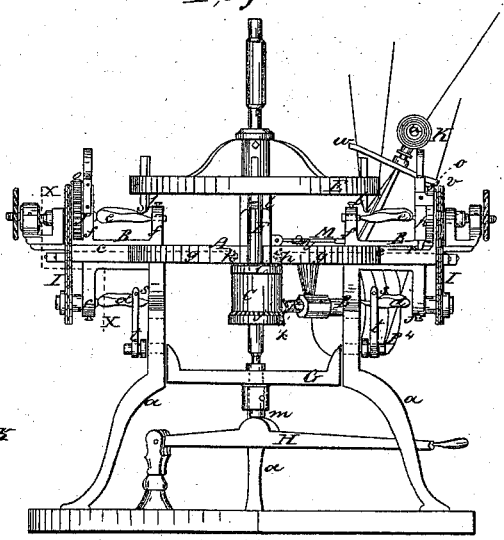
Figure 4:
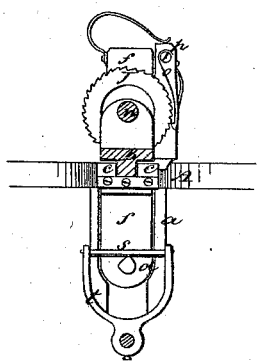

Figure 1, is a plan or top view of the machine. Fig. 2, is a view of ditto in elevation, one of the carriages, and also one of the legs of the machine, nearest the eye, being removed. Fig. 3, is a section showing the manner in which the belt shipper is operated. Fig. 4, is a section of one of the carriages, X, X, Fig. 2, is the line of section. This view shows the manner in which the pattern, and the block to be cut in the shape of the pattern, is turned, and also the manner in which the pattern is made to operate the cutting wheel so that the cutters will act upon the block and cut it of a shape corresponding to the pattern. In this view the endless chain and pulleys over which the chain passes, are not represented, one of the pulleys is omitted and the other is cut off owing to the direction of the line of section. This will be seen by referring to Fig. 2.

Similar letters of reference indicate corresponding parts in each of the several figures.

This invention relates to an improved machine for cutting article of irregular form such as shoe lasts, wheel spokes et cetera, et cetera, and consists in a peculiar arrangement and combination of a series of carriages and a horizontal cutting wheel said carriages containing the patterns and the rough blocks which are to be cut the shape or forms of the patterns. By which arrangement and combination as will be hereafter shown and described several blocks are operated upon simultaneously and cut in a perfect manner and the precise form of the patterns.

To enable others skilled in the art to make and use my invention, I will proceed to describe its construction and operation.

A, represents a circular horizontal disk supported by four pedestals or legs ($a$) three of them are seen in Fig. 2. This disk A, has four radial slots ($b$) ($b$) ($b$) ($b$) cut through it, see Fig. 1. On the periphery of the circular disk A, are projections or arms ($c$) which are in line with the slots and may be described as extending said slots beyond the periphery of the disk A, two arms being in line with each slot.

B, B, B, B, are carriages which work in the slots ($b$) and on their arms ($c$). Those carriages contain the patterns and also the rough blocks which are to be cut the shape of the patterns. The carriages, or rather the heads ($f$) of the carriages extend both above and below the disk A, see Fig. 2. Below the disk A, the patterns, represented by ($d$) are centered, and above the disk A, the rough blocks represented by ($e$) Fig. 2, are centered. The blocks are not shown in Fig. 1. The lower part of the inner heads of the carriages are not seen in Fig. 2, as they are covered by the legs ($a$). The upper parts of the legs have slots through them and the lower part of the inner heads of the carriages work in the slots, as will be seen in the enlarged section Fig. 4.

Longitudinally through the center of each carriage there is a screw rod ($g$) see Fig. 1, and red lines in Fig. 2, which works in a female screw cut in the carriage. The inner ends of these screw rods have beveled wheels ($h$) upon them which mash into a horizontal bevel wheel ($i$) on the upper part of $a$, collar C. At the lower end of this collar there is also a bevel wheel ($j$) into which a beveled pinion ($k$), at the end of a driving shaft D, meshes, see Fig. 2. Now it will readily be seen that by turning the shaft D, the carriages B, will move in the slots ($b$) either toward the center of the disk A, or from it according to the direction in which the shaft D, is turned.

E, is a horizontal cutting wheel placed on a vertical shaft F. This cutting wheel has a series of cutters ($l$) placed vertically through it near its edge or periphery. The shape of the cutters will be seen by referring to Fig. 2, they are of gage form. The shaft F, passes through the center of the disk A, and collar C, and is stepped upon the upper part of a small rod ($m$) which passes through the center of a cross-tree G, the rod ($m$) having a collar on its upper end which collar prevents the rod ($m$) falling through the cross tree see Fig. 2. The lower end of the rod ($m$) rests or bears upon a lever H, by operating which the cutter wheel E, may be elevated when desired. The object in raising or elevating the cutter wheel at certain times will be hereafter explained.

I, are endless chains which pass over pulleys on the upper and lower outer center shafts of the carriages. These endless chains are for the purpose of communicating motion from the upper to the lower outer center shaft. This motion is communicated in the following manner: J, is a ratchet wheel hung on the upper center shaft (n) see Fig. 4, and red lines in Fig. 1. The upper pulley over which the endless chain passes is not shown in this figure, it will be seen by referring to Figs. 1, and 2. The upper pulley however is attached to the outer side of the ratchet wheel J, and a pawl (o) which is attached to a vertical slide (p) catches into the teeth of the ratchet. The slide (p) is attached to the outer head (f) of the carriage and has a dove tail which works in a corresponding shaped recess in the edge of the outer head (f), one of the arms (c) of each slot (b) has a recess (r) in it, better seen in Fig. 2, and the lower end of the slide works in this recess. The operation of the several parts will now be readily seen. By giving motion to the shaft D, say in a direction toward the eye, the several carriages will be moved toward the center of the disk A, now the cutter wheel E, revolves over the rough block (e) and the cutters (l) act upon them. Upon the patterns (d) there rest rollers (s) which are secured in grooves (t) attached to the ends of the cross tree G. Now it will be seen that as the carriages are moved the patterns will give the required depth of cut to the cutters, the gravity of the cutter wheel, its shaft, and the cross tree, causing the rollers (s) to bear upon the patterns (d). Thus the rough blocks are cut longitudinally the same shape as the patterns.

When the carriages are moved inward or toward the center of the disk A, as far as they will go, the motion of the shaft D, is reversed and the carriages move outward from the center of the disk A, the cutters acting upon the rough blocks as the carriages are moved in either direction.

It will be seen that it is necessary that the pattern and rough blocks should be turned at each vibration or stroke of the carriages, that is, when the carriages have been moved inward as far as they will go, and also when they have been moved outward. This is accomplished by means of the slide (p) and endless chain I, before described. The recess (r) in the arm has inclined ends, distinctly seen in Fig. 2, and as the lower end of the slide works in this recess, it will be seen that as the slide passes up the incline at either end of the recess the slide is raised and consequently the pawl (o), and the upper pulley over which the endless chain I, passes is turned and a corresponding motion is communicated to the lower center shaft, and pattern (d). Thus it will be seen that the pattern and rough blocks are turned a certain distance every time the motion of the carriages change and consequently the blocks will be cut the precise form of the pattern. One thing remains to be described, videlicet, the manner in which the reverse motion is given the driving shaft D. Upon the outer end of the driving shaft are placed four pulleys P′, P², P³, P⁴. The two center pulleys P², P³, are what are termed idle pulleys and the other two P′, P⁴, are working pulleys or are attached firmly to the driving shaft. The belt that passes over the outer working pulley is straight, but the belt that passes over the inner working pulley is crossed, consequently as the changes of the belts are made the motion is reversed. The changes are effected by means of a belt slipper K, having a weight (u) at its upper end and two horizontal arms (v) (w) the straight belt passes through a slot in the end of the arm (v) and the cross belt passes through a slot in the end of the arm (w) see Figs. 1 and 3. The lower end of the belt shipper is secured by a pivot in an arm L, projecting from the periphery of the circular disk A, M, is a jointed lever having its fulcrum at (y) one end of this lever is attached to the belt shipper, and the opposite end has an eye (z) through which a horizontal rod N, attached to one of the carriages passes, see Fig. 3. Now when the straight belt acts upon the outer pulley P⁴, and the carriages are moved inward to the full extent, a stop (z′) at the outer end of the rod comes in contact with the eye (z) of the lever M, and throws the belt shipper toward the center of the machine, and the cross belt is thrown over the inner working pulley P′, and the straight belt over one of the idle pulleys, P³. A reverse motion is given the belt shipper when the carriages are moved to their fullest extent outward and consequently the motion of the shaft is again changed.

Any number of carriages may be employed according to the size of the machine, only two complete carriages are represented in the drawings, these are sufficient to show clearly the invention as all the carriages used are precisely similar to each other. In large machines and in cutting certain articles such as spokes several rough blocks may be inserted in one carriage by having a number of centers in each carriage. When the blocks are finished the cutter wheel is raised by raising the lever H, and the blocks may be taken from their centers without any difficulty. The cutter wheel is driven by a detached band which may pass around a pulley on the upper end of the shaft F.

What I claim as my invention and desire to secure by Letters Patent, is—

1. Combining the series of patterns *d, d,* and the chucks for the blocks *e, e,* with each other and with the collar C, the vertical slides *p, p,* the polls *s, s,* the ratchet wheels J, J, and the recesses *r, r,* in the arms *c, c,* or their equivalents—in such a manner that said series of patterns and blocks shall have corresponding compound rotary and longitudinally reciprocating movements imparted to them, substantially in the manner and for the purpose herein set forth.

2. I also claim supporting the weight of the cutter wheel E, upon a series of rotating and longitudinally reciprocating patterns *d, d,* when said patterns are combined with chucks for a series of blocks *e, e,* in such a manner that corresponding movements shall be imparted to said patterns and blocks, and said blocks be so situated as to be operated upon by the cutters *l, l,* substantially in the manner and for the purpose herein set forth.

O. L. REYNOLDS.

Witnesses:
J. B. GARLAND,
R. M. JOHNSON.